Patented July 2, 1940

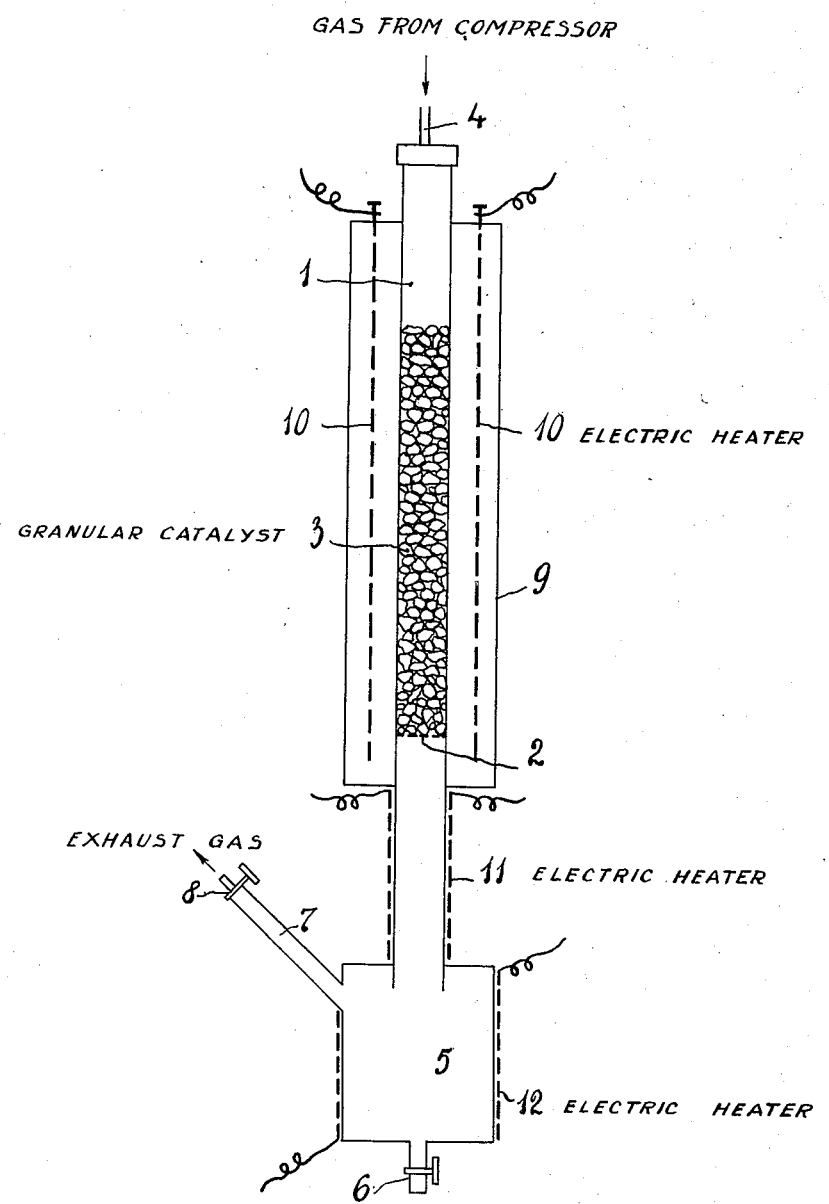

2,206,500

UNITED STATES PATENT OFFICE 2,206,500

PROCESS FOR PREPARING SOLID PARAFFINS

Franz Fischer and Helmut Pichler, Mulheim-Ruhr, Germany, assignors, by mesne assignments, to Hydrocarbon Synthesis Corporation, Linden, N. J.

Application July 16, 1937, Serial No. 153,924
In Germany August 1, 1936

6 Claims. (Cl. 260—449)

Our invention relates to the production of paraffin and more particularly of paraffin products of high melting point and other hitherto unknown properties. The invention also includes the process of producing such products.

In the synthetic process for the production of benzine disclosed in the specification of U. S. Patent No. 1,746,464, in which carbon oxides are heated in the presence of hydrogen and highly active catalysts containing metals of the eighth group of the periodic system and under atmospheric or only slightly raised pressure, aliphatic hydrocarbons boiling at different temperatures, amongst them also solid paraffin, are recovered. According to the conditions under which this process is carried through, the yield of paraffin ranges between about 4 and 10%, so that the paraffin may be said to be only a byproduct, while by far the greater part of the reaction products escapes from the reaction chamber in the form of vapors or gases. The comparatively small quantities of paraffin which adhere to the catalyst are removed, in this prior process, at the end of a working period, i. e. after some weeks or months, from the catalyst by extraction with suitable solvents or by other means.

In other catalytic reactions conducted under pressure, in which carbon monoxide and hydrogen are reacted with each other in the presence of iron catalysts, the reactions being carried through in vertically or horizontally disposed tubular reaction vessels, no formation of higher percentages of paraffin has been observed. The iron catalysts used in these reactions have been found to be unsuitable for the continuous production of greater quantities of paraffin.

When reacting carbon monoxide with hydrogen in contact with cobalt catalysts under a pressure above normal, for instance 5 to 80 atmospheres, liquid and gaseous hydrocarbons are obtained in the first line.

We have found that if it is desired to obtain in such a reaction greater quantities of paraffin, the catalyst must be impregnated with paraffin in such manner that the cavities existing between the individual particles of the catalyst are not clogged by paraffin. We are enabled, according to the present invention, to produce large percentages of paraffin of particularly favorable properties, which is solid at room temperature, by passing a gas mixture containing carbon monoxide and hydrogen under a pressure above atmospheric pressure and at a temperature ranging between about 125 and 250° C. in contact with cobalt catalysts, which are impregnated with paraffin solid at room temperature, but which does not clog the cavities existing between the individual catalyst particles, provided that care is taken that the paraffin formed in the reaction is free to permanently drip off the catalyst.

We may employ from the beginning a catalyst already impregnated with the paraffin, but we may also cause the catalyst to become impregnated with the paraffin in the course of the synthetic process. If proceeding in the manner last mentioned the starting period will extend over several days, during which the catalyst is changed into a state which quite particularly favors the formation of solid paraffin.

In the process previously suggested of reacting carbon monoxide with hydrogen under pressure in the presence of cobalt catalysts the operations were always interrupted after a few hours and never extended over more than twelve hours, whereupon the catalysts were subjected to an oxidation treatment with air. The alternating charging of the catalyst with a mixture of carbon monoxide and hydrogen on the one hand and air on the other hand rendered an impregnation of the catalyst with paraffin and consequently also the production of paraffin impossible. Owing to the circumstance that in the reaction apparatus the products of reaction were formed in a horizontally extending tube, no favorable conditions for the production of paraffin were present, since it is important that the paraffin formed in the reaction be free to flow off the catalyst, in order to prevent the catalyst from being submerged in the paraffin and thus withdrawn from contact with the gases.

For similar reasons the suspension of the cobalt catalyst in oil did not lead to the formation of considerable quantities of paraffin, and it has also been found that, if suspended in oil, the cobalt catalysts very soon lose their activity.

In the process according to this invention a gas mixture containing for instance one part carbon monoxide on two parts hydrogen is conducted in contact with the cobalt catalyst at a temperature within the range of about 125 and 250° C. and under a pressure above two atmospheres and for instance at 4 or 10 or 20 atmospheres. Care should be taken to remove the heat of reaction and to keep the temperature constant. It is further important that the paraffin formed on the catalyst be able to flow off in order to prevent it from being changed and the catalyst from being withdrawn by the paraffin to the gases under reaction.

In order further that a high melting paraffin be recovered, the catalyst should either be impregnated with paraffin from the beginning or should form the paraffin for impregnation during the starting period extending over a few days, it being necessary that the individual particles of the catalyst remain in their relative position and be not changed exteriorly.

We have found that at a pressure above 100 atm. traces of cobalt may evaporate in the form of carbonyl, but that even at such pressure paraffin will be formed.

Instead of a gas mixture containing one part carbon monoxide and two parts hydrogen we may also start from mixtures containing these gases in a different proportion or from mixtures containing also other gases.

We may operate in the presence of any catalyst containing cobalt and suitable in the synthetic production of benzine. In order to facilitate the dripping off of the paraffin, we prefer arranging the catalyst in vertically extending reaction vessels, wherein the reaction products can be tapped at the bottom of the vessel. However operation in vertically disposed vessels is not necessary, it being also possible to react the gases in vessels disposed in inclined position or to arrange the catalyst on horizontally extended perforated sheets, sieves or the like.

In the drawing affixed to this specification and forming part thereof an apparatus adapted for use in carrying out this process is illustrated in a purely diagrammatic manner by way of example.

Referring to the drawing, 1 is the vertically mounted tubular reaction vessel, 2 is a perforated bottom mounted therein, 3 is a body of granular catalyst, 4 is the gas inlet at the top of the vessel, 5 is a receiver at the bottom end of and communicating with the vessel 1, 6 is a valve for tapping the liquid reaction product, 7 is an exhaust pipe for the gaseous reaction products and the residual gases which may escape from the reaction, 8 being a gas expansion valve. 9 is an electrical oven and 10 are the electrical heaters mounted in this oven and serving to heat the part of the reaction vessel filled with the catalyst. 11 is an electrical heater surrounding the bottom end of the reaction vessel and 12 is a heater for heating the receiver 5.

In operating our invention we may for instance proceed as follows:

Example 1

On the perforated bottom 2 in the reaction vessel 1 is arranged a column of granular cobalt-thorium-kieselguhr catalyst containing 4 grams cobalt, this catalyst being produced by adding to a solution of cobalt nitrate containing 4 grams cobalt a quantity of thorium nitrate in the proportion of 1.8 $ThO_2$:10 Co and of kieselguhr in the proportion of 1 kieselguhr:1 Co, this solution being precipitated with the calculated quantity of soda, the precipitate being filtered, washed out, dried, granulated and reduced with hydrogen in the reaction vessel.

Through this vessel, in which the catalyst is heated to 190° C., are passed under a pressure of 4 atm. 4 liters (measured under atmospheric pressure) per hour of a gas mixture containing 30% carbon monoxide and 60% hydrogen. The contraction of the gases occurring in consequence of the reaction amounts to 75%, the remainder being mostly carbon monoxide and hydrogen which have escaped the reaction, nitrogen and gaseous hydrocarbons. From the second day on the yield of paraffin, solid at room temperature, which drips off the catalyst, amounts to 90–100 grams per cubicmeter of the gas mixture introduced into the vessel. About 1% of this paraffin product is insoluble in boiling ether and melts within the range of 110–114° C. In order to prevent paraffin from accumulating in the catalyst body, the part of the reaction vessel projecting from and below the oven is heated by means of the heater 11 to a temperature above the melting point of the paraffin. In the waste gases escaping through 7 about 20 grams benzine are found. The activity of the catalyst remains unchanged during many months and even for an almost infinite period provided that the operation is carried through under a pressure ranging between 5 and 20 atm.

In the catalyst the proportion of cobalt to the other constituents may vary within wide limits, for instance 1 Co may be combined with 0.1 or with 0.5 Th and some per cent of copper may be present also.

Example 2

If the same apparatus is charged at the same temperature with a similar gas mixture, however under a pressure of 10 atmospheres, the contraction in consequence of the reaction amounts to about 76% and there are obtained, from the third day on, about 100–110 grams per cubicmeter of the gas mixture of a paraffin product solid at room temperature and 13% of which are insoluble in boiling ether and melt within the range of 110–114° C. The waste gases escaping at 7 contain about 20 grams benzine. The activity of the catalyst remains unchanged for months.

Example 3

If operating under the same conditions and with the same starting gas mixture, however under a pressure of 20 atm., the contraction amounts to 75–80% and there are obtained about 120 grams, per cubic meter of the gas mixture, of a paraffin product solid at room temperature. The total quantity of raw paraffin, about 120 grams of which are recovered per cubic meter of the gas from the fourth day on, melts entirely above 100° C. It has a clear white color and is almost free from any odor. 22% of the paraffin product are insoluble in boiling ether and melt within the range of 110–114° C. The waste gases still contain about 20 grams benzine. The catalyst remains active for months. If it is extracted after an extended period of operation it is found that the catalyst contains paraffin products melting at still higher temperatures, at and above 130° C.

No paraffin products possessing similar properties have hitherto become known.

Various changes may be made in the details disclosed in the foregoing specification without departing from the invention or sacrificing the advantages thereof.

We claim:

1. The process of producing paraffin products solid at ordinary temperature, which comprises reacting carbon monoxide with hydrogen at a temperature ranging between 125 and 250° C. under a pressure above 4 atmospheres in the presence of a solid catalyst containing cobalt as the main active ingredient coated with paraffin solid at room temperature, approximately one liter, measured under atmospheric pressure and at room temperature, of the mixture of carbon monoxide and hydrogen being hourly contacted with the quantity of catalyst which contains one gram cobalt, and causing all but a thin coating of paraffin to drip off from said catalyst whereby to prevent clogging of the cavities existing between the individual catalyst particles.

2. The process of claim 1, in which the gases are reacted in contact with the catalyst under a pressure ranging between 5 and 20 atmospheres.

3. The process of claim 1, in which the gases are reacted in contact with the catalyst at a temperature of about 190° C. and under a pressure ranging between 5 and 20 atmospheres.

4. The process of claim 1, in which the gases are brought to reaction in the presence of a catalyst at a temperature of about 190° C. under a pressure of 20 atmospheres.

5. The process of claim 1, in which the gas mixture passed in contact with the catalyst contains carbon monoxide and hydrogen in the proportion of 1 Co:2 $H_2$.

6. The process of claim 1, in which the catalyst is a cobalt-thorium catalyst deposited on kieselguhr.

FRANZ FISCHER.
HELMUT PICHLER.